Patented Nov. 13, 1928.

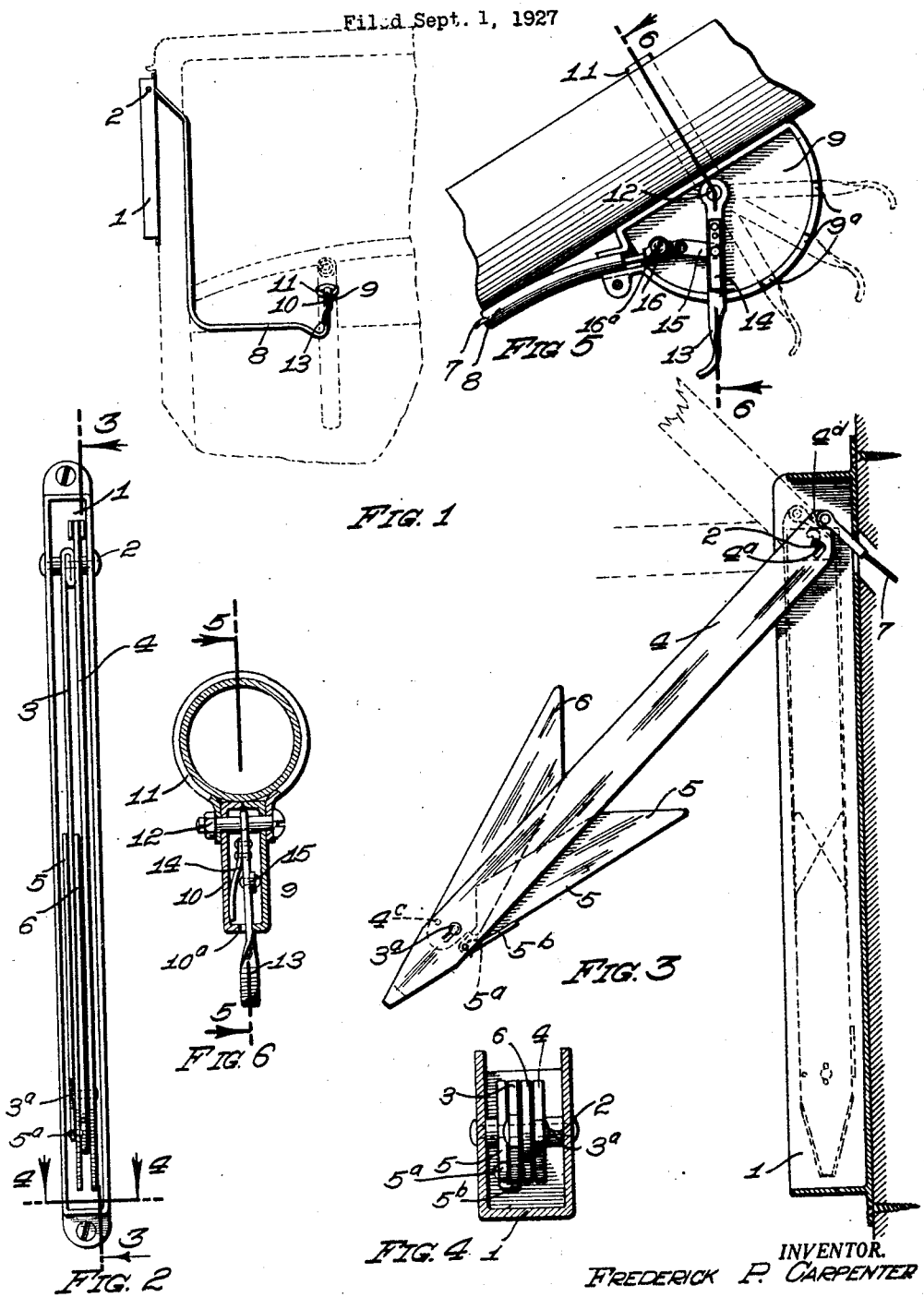

1,691,431

UNITED STATES PATENT OFFICE.

FREDERICK P. CARPENTER, OF SAN DIEGO, CALIFORNIA.

VEHICLE DIRECTION SIGNAL.

Application filed September 1, 1927. Serial No. 216,861.

My invention relates to vehicle direction signalling means, more particularly to manually operated means for indicating the directions a vehicle is about to take, and the objects of my invention are: First, to provide a device of this class which is visible from the driver's seat, thus the driver can always observe whether or not the device is functioning; second, to provide a device of this class which is adapted to be placed in a position from which drivers of other vehicles expect to see signals; third, to provide a device of this class which is simply controlled by a lever positioned under the steering column of a vehicle; fourth, to provide a device of this class which is especially adapted for closed vehicles; fifth, to provide a device of this class which can be built in the side of a vehicle, thus having no exposed parts when in its closed position; sixth, to provide a device of this class in which the arrow head folds up in the case thereby permitting the case to be of a minimum width, just wide enough to accommodate the arrow shaft; seventh, to provide a device of this class which is compact and simple of construction; eighth, to provide a device visible from both front and rear of the vehicle, and ninth, to provide a device of this class which is positive in its action, easily installed, durable, efficient in its action, and which will not readily deteriorate or get out of order.

With these and other objects in view, as will appear hereinafter, my invention consists of certain novel features of construction, combination and arrangement of parts and portions as will be hereinafter described in detail and more particularly set forth in the appended claims, reference being had to the accompanying drawings and to the characters of reference thereon which form a part of this application, in which:

Fig. 1 is a diagrammatic view of my signalling apparatus, showing its relation to a vehicle, the vehicle being shown in outline by dotted lines; Fig. 2 is a side elevational view of my signalling device when in its closed position; Fig. 3 is a sectional view thereof through 3—3 of Fig. 2 and with the signalling means in one of its extended positions; Fig. 4 is an enlarged transverse sectional view thereof through 4—4 of Fig. 3; Fig. 5 is a sectional view of the signal actuating means through 5—5 of Fig. 6 with parts and portions shown in elevation to facilitate the illustration; Fig. 6 is a sectional view thereof at right angles to Fig. 5 through 6—6 of Fig. 5 with parts and portions shown in elevation to facilitate the illustration.

Similar characters of reference refer to similar parts and portions throughout the several views of the drawings.

The casing 1, pinion 2, arrow shafts 3 and 4, arrow head members 5 and 6, cable 7, cable guide 8, quadrant segments 9 and 10, clamp 11, bolt 12, signalling actuating lever 13, spring 14, connecting link 15, cable end clamp 16, constitute the principal parts and portions of my vehicle direction signalling apparatus.

The casing 1 is channel shaped and closed at its ends, thus forming a comparatively long, narrow, rectangular casing for the signalling indicator. The back or supporting side of the casing 1 is provided with lugs $1^a$, which extend past the end of the casing and which are provided with holes therethrough for screws or bolts for fastening the device on the vehicle.

The signalling indicator consists of two shafts which are mounted on a pinion 2 which extends through the side walls of the casing 1. The shafts and arrow heads are preferably made of sheet metal cut to the desired width, and two arrow head members at the extended ends of said shafts. The supported end of the arrow shaft 3 is made considerably thicker than the body of the shaft so as to space it from the arrow shaft 4, as shown best in Fig. 2 of the drawings. The extended ends of the shafts 3 and 4 are tapered and come to a blunt point. The shaft 3 is provided with a hole therethrough near the lower edge and near its extended end. Extending through the hole is a pinion $3^a$ on which is pivotally mounted the one end of the arrow head member 5. The arrowhead member 5 is provided with an extended lug $5^a$ at the one end thereof through which extends the pinion $3^a$. The other end of the arrow head 5 is bevelled so that when it is in the position shown in Fig. 3 of the drawings the unsupported end of the arrow head extends outwardly and upwardly from the unsupported end of the arrow shaft. On the longer or outer edge of the arrow head 5 is another lug $5^b$ which extends up from the face of the arrow head and engages the side edge of the arrow shaft 3 thus limiting the pivotal movement of the arrow head 5 in relation to the shaft 3 as shown best in Fig. 3 of the drawings. Centered on the longitudinal axis the shaft 3 near its extended end, is another hole through which extends a pinion $3^b$.

The pinion 3ᵇ extends through an arcuate slot 4ᵇ of the arrow shaft 4. Pivotally mounted by its one end on the arrow head 3ᵇ is a pinion 6. The pinion is further secured to the arrow shaft 4 by means of a pinion 4ᶜ which is positioned at the center of the circle of which the arcuate slot 4ᵇ is an arc of. A longitudinal movement of the shaft 4 in relation to the shaft 3 causes the arrow head 4 to rotate on its pivotal axis and the movement thereof is limited by the length of the slot 4ᵇ. The supported end of the shaft 4 is pivotally mounted on the pinion 2 by means of an inverted L shaped slot 4ᵃ therein which, when the shaft is moved from the one end of the slot 4ᵃ to the other, causes it to travel in a longitudinal movement in relation to the shaft 3 and thus actuate the arrow head 6. The slot 4ᵃ tends to maintain the arrow head in either open or closed position as desired. The shaft 4 extends above its pivotal point a short distance forming a lug 4ᵈ. An actuating cable 7 which is formed from stiff yet resilient wire, extends downwardly into the body of the vehicle through a slot 1ᵇ in the casing 1 and is connected to the arrow shaft 4 by a U-shaped connecting member 7ᵃ the legs of which extend on either side of the lug 4ᵈ and permit a pivotal connection of the cable with the shaft 4.

The weight of the arrow head 5 causes it to assume the position shown by solid lines in Fig. 3 of the drawings as soon as the shafts 3 and 4 clear the casing. The upper arrow head is moved to its extended position when the shaft 4 is pulled downwardly by the cable 7 and is supported on the pinion 2 by the upper portion of the slot 4ᵃ. When the arrow shaft 4 is pushed upwardly by the cable 7 the arrow head is moved to its closed position as shown by the dotted lines showing the closed position in Fig. 3.

The cable 7 connects the signal indicator or arrow with the signal actuating means and is encased in a cable cover 8 which may be either flexible or comparatively non-flexible according to the number of turns necessary. The signalling actuating means is preferably located just underneath the steering post A, or may be positioned any other place which is convenient for the driver.

The signalling actuating means consists of two casing members 9 and 10. The casing members 9 and 10 are semi-circular in outline with one straight supported edge and a curved edge portion depending therefrom. A clamp 11 extends around the steering post A and the ends thereof extend over each of the casing members 9 and 10 and is secured thereto by means of the bolt 12 which extends through the casing members 9 and 10 and holds the clamp and casing members together. The bolt 12 also serves as the bearing or pinion for the signalling actuating lever 13. The signalling actuating lever 13 extends through the curved side of the casings 9 and 10 and is provided with a handle means at the extended end thereof.

The casing 9 is provided with a plurality of spaced apart grooves 9ᵃ in the arcuate edge thereof adjacent to the arcuate edge of the casing 10. The casing 10 has a single groove 10ᵃ which extends the whole length of the slots 9ᵃ and thus forms with the casing 9 therewith a long slot with offset portions extending therefrom. The slot thus formed is equal in length to the arc through which the lever 1ᵇ passes.

Secured to the one side of the actuating lever 13 is a spring 14 which presses against the side of the casing 10 and tends to force the actuating lever into the slots 9ᵃ. By pressing the lever towards the casing 10 into the slot 10ᵃ, the lever 13 can be moved to any desired position. As each slot 9ᵃ corresponds to a signalling position of the indicator the lever 13 can be moved to a desired position opposite or near 9ᵃ and released, the indicator will then be held in position. The actuating lever 13 is connected to the cable 7 by means of a link member 15 which is pivotally connected to the actuating lever 13. The other end of the link 15 is connected to a clamp member 16 which clamps the end of the cable 7. The clamp member 15 consists of a piece of metal doubled over and provided with a longitudinally extending opening for the cable 7. Lugs extend from one side of the clamp through which extends a screw 16ᵃ which, when tightened, clamps the two halves of the metal tightly to the cable 7. Thus, when assembling the device, the cable is passed through the clamp member 16 until the cable is of the right length and the actuating means is positioned at its proper place, then the end of the cable is cut off and the clamp member clamped over. The casing members 9 and 10 have oppositely disposed, semi-cylindrical openings extending from the side thereof near their supported portion, only one half of the semi-cylindrical openings being shown in Fig. 5 of the drawings. The semi-cylindrical portions 9ᵇ are provided with lugs through which extends a screw for clamping the end of the cable support or cable covering. The cable covering may be cut off at any desired length and clamped similar to the method of clamping the cable 7. Thus a means whereby the cable and covering may be easily made the desired length for any vehicle is provided.

The operation of the device is as follows: When no signal is desired the indicating arrow is in its folded position as shown by the first set of dotted lines in Fig. 3 of the drawings, and the actuating lever is in the position shown by the solid lines in Fig. 5 of the drawings. As the actuating lever 13 is moved in the slot 10ᵃ to the position shown by upper set of dotted lines in Fig. 5, the indicator is moved from its closed position to the position shown by the upwardly extending set of dotted lines shown in Fig. 3 of the drawings. By placing the notches 9ª at intervals the lever 13 holds the indicating means in the different desired positions as shown by the different sets of dotted lines and the solid lines shown in Fig. 3 of the drawings.

It will be noted that by positioning the device as shown by Fig. 1, that the indicating means is always in plain view of the driver and he can easily observe whether the device is operating or not.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a signalling means of the class described, a casing, an indicating means pivotally mounted therein, said indicating means comprising a pair of independently pivoted, relatively shiftable shafts, a pair of arrow head members, one of said arrow head members pivotally connected to one of said shafts, and a second arrow head pivotally mounted in said shaft actuated by the longitudinal movement of one shaft in relation to the other.

2. In a signalling means of the class described, a casing, an indicating means pivotally mounted therein, said indicating means comprising a pair of independently pivoted, relatively shiftable shafts, a pair of arrow head members, one of said arrow head members pivotally connected to one of said shafts, a second arrow head pivotally mounted in said shaft actuated by the longitudinal movement of one shaft in relation to the other, and said arrow heads adapted to fold flush with the edges of said shaft when said shafts are in said casing.

3. In a signalling means of the class described, a casing, an indicating means pivotally mounted therein, said indicating means comprising a pivoted arrow shaft, an arrow head mounted in limited pivotal relation to said shaft, a second pivoted arrow shaft longitudinally shiftable relative to said first shaft, and a second arrow head pivotally mounted in said arrow shaft.

4. In a signalling means of the class described, a casing, an indicating means pivotally mounted therein, said indicating means comprising an arrow shaft, an arrow head mounted in limited pivotal relation to said shaft, a second arrow shaft, a second arrow head pivotally mounted in said arrow shaft, said second mentioned arrow head operated by the longitudinal movement of said second mentioned shaft in relation to said first mentioned shaft, and said first mentioned arrow head operated by gravity.

5. In a signalling means of the class described, a casing, an indicating means pivotally mounted therein, said indicating means comprising an arrow shaft, an arrow head mounted in limited pivotal relation to said shaft, a second arrow shaft, a second arrow head pivotally mounted in said arrow shaft, said second mentioned arrow head operated by the longitudinal movement of said second mentioned shaft in relation to said first mentioned shaft, and said first mentioned arrow head operated by gravity, and said arrow heads adapted to fold flush with the edges of said shafts when said shafts are in said casing.

6. In a signalling means of the class described, a casing, a pivot pin supported at one end thereof, a pair of spaced apart parallel disposed flat shafts pivoted at their one end on said pin, one of said shafts having an arcuate slot for receiving said pin and allowing for slight longitudinal and lateral movement relative to the other shaft, and an arrowhead member collapsibly mounted at the free end of said shafts and means actuated by the relative movement of said shaft for causing said arrowhead member to be laterally extended relative to said shaft when the latter are moved out of said casing, and means for actuating said shaft.

7. In a signalling means of the class described, a casing, a pivot pin supported at one end thereof, a pair of spaced apart parallel disposed flat shafts pivoted at their one end on said pin and allowing for slight longitudinal and lateral movement relative to the other shaft, an arrowhead member positioned between the outer ends of said shafts, pivotally mounted on one of said shafts and means actuated by the relative movement of said shaft for causing said arrowhead member to be laterally extended relative to said shaft, a second gravity operated arrowhead member pivotally secured to the outer end of said shaft and means for actuating said shaft.

In testimony whereof, I have hereunto set my hand at San Diego, California, this 25th day of August, 1927.

FREDERICK P. CARPENTER.